(12) United States Patent
Van Hillo et al.

(10) Patent No.: US 9,138,008 B1
(45) Date of Patent: Sep. 22, 2015

(54) POULTRY NECK BREAKER MACHINE AND METHOD FOR BREAKING THE NECK OF POULTRY

(71) Applicant: Meyn Food Processing Technology B.V., Oostzaan (NL)

(72) Inventors: Eric Adriaan Van Hillo, Oostzaan (NL); Jan Willem Hagendoorn, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 14/643,270

(22) Filed: Mar. 10, 2015

(30) Foreign Application Priority Data

Mar. 13, 2014 (NL) ..................................... 2012430

(51) Int. Cl.
*A22C 21/00* (2006.01)
*A22B 3/08* (2006.01)
*A22B 1/00* (2006.01)

(52) U.S. Cl.
CPC ... *A22B 3/08* (2013.01); *A22B 1/00* (2013.01); *A22C 21/00* (2013.01); *A22C 21/0046* (2013.01)

(58) Field of Classification Search
USPC ........... 452/52, 53, 54, 63, 64, 116, 149, 150, 452/154, 155, 165–168
See application file for complete search history.

(56) References Cited

U.S. PATENT DOCUMENTS

| | | | |
|---|---|---|---|
| 3,965,534 A | | 6/1976 | Harben |
| 4,097,960 A | * | 7/1978 | Graham et al. ............... 452/168 |
| 4,516,290 A | * | 5/1985 | van Mil ......................... 452/118 |
| 4,557,015 A | * | 12/1985 | Dodd ............................. 452/165 |
| 4,574,427 A | * | 3/1986 | Harben et al. ................ 452/117 |
| 4,619,017 A | * | 10/1986 | Simmons ....................... 452/168 |
| 4,730,365 A | * | 3/1988 | Simmons ......................... 452/52 |
| 4,894,885 A | * | 1/1990 | Markert ........................... 452/53 |
| 4,910,829 A | * | 3/1990 | Simmons ...................... 452/116 |
| 4,918,787 A | * | 4/1990 | Hazenbroek .................. 452/116 |
| 5,569,072 A | * | 10/1996 | Tieleman et al. ............. 452/185 |
| 5,766,063 A | * | 6/1998 | Hazenbroek et al. ......... 452/117 |
| 6,027,403 A | | 2/2000 | Hazenbrock et al. |

OTHER PUBLICATIONS

Search report for NL 2012430, dated May 7, 2014.

* cited by examiner

*Primary Examiner* — Richard Price, Jr.
(74) *Attorney, Agent, or Firm* — Dority & Manning, P.A.

(57) ABSTRACT

Poultry neck breaker machine for poultry suspended by the legs in a conveyor line, comprising a movable breaker device for imparting a breaking force to the poultry's neck, and comprising an anvil to provide support to the poultry's neck during operation of the movable breaker device, wherein the anvil is arranged for introduction into a poultry cavity through the poultry's vent. The invention also relates to a method for breaking a poultry's neck while the poultry is suspended by the legs in a conveyor line, wherein a breaking force is imparted to the poultry's neck while the poultry's neck is supported, wherein the poultry's neck is supported from within the poultry.

16 Claims, 5 Drawing Sheets

POULTRY NECK BREAKER MACHINE AND METHOD FOR BREAKING THE NECK OF POULTRY

PRIORITY STATEMENT

The present application claims priority under 35 U.S.C. §119 to Dutch Application No. 2012430, filed Mar. 13, 2014.

FIELD OF THE INVENTION

The subject matter of the present disclosure relates generally to method for breaking the neck of poultry and to a poultry neck breaker machine wherein the poultry is suspended by the legs in a conveyor line, which machine includes a movable breaker device for imparting a breaking force to the poultry's neck, and includes an anvil to provide support to the poultry's neck during operation of the movable breaker device.

BACKGROUND OF THE INVENTION

Poultry neck breaker machines and methods are known from European patent application EP-A-1 728 433 and from U.S. Pat. No. 3,965,534.

According to EP-A-1 728 433, a curved breaker device is applied that is rotatable around a point of fixation which can be leveled to a position corresponding with a desired plane of impact of the breaker device to the neck of the poultry. A backplate external to the poultry is provided as its support during operation of the breaker device.

According to U.S. Pat. No. 3,965,534 a carriage is proposed for three blades that each operate as breaking device for a poultry's neck. Accordingly, three poultry necks can be broken at the same time. Upon activation, the three blades are rammed towards the poultry necks. Underneath the blades, V-shaped neck guide bars are provided that become operational after the poultry necks are positioned with rotatable guide bars extending across a trough along with the poultry necks that are to be broken are conveyed. The carriage includes three backing plates to provide support to the poultry necks during ramming of the three blades.

Although the technology of breaking the neck of poultry is long existing, there is an everlasting need to improve its reliability and accuracy. It is a first object of the invention to answer to this need.

A further object of the invention is to harvest poultry necks as complete as possible and to improve the yield in comparison with existing methods. In this connection it is noteworthy to mention that the monetary value of completely harvested necks of a particular weight is higher than incompletely harvested necks of the same weight.

It is still a further object of the invention to harvest poultry necks while the poultry carcasses incur as little damage as possible, therewith improving the attractiveness of those carcasses.

SUMMARY OF THE INVENTION

These and other objects and advantages of the invention are promoted or attained with a poultry neck breaker machine and a method for breaking poultry necks having the features of one or more of the appended claims. Additional aspects and advantages of the invention will be set forth in part in the following description, or may be obvious from the description, or may be learned through practice of the invention.

In a first aspect of the invention a method is proposed for breaking a poultry's neck, in which the poultry's neck is supported from within the poultry by arranging that the anvil of the poultry neck breaker machine is introduced into the poultry cavity through the poultry's vent. This aspect improves the accuracy and reliability of the method.

It is preferred that during operation of the movable breaker device the anvil lies adjacent to the poultry's spinal cord so as to arrange that the anvil can support the poultry's neck when the breaker device imparts a breaking force to the poultry's neck.

Suitably the movable breaker device is embodied with, or as, a back-and-forth movable chisel. Such a chisel can be easily moved back and forth for instance by appropriate pneumatic equipment, in particular when the chisel is movable back-and-forth in a horizontal direction. It one exemplary embodiment, the back-and-forth movable chisel is forcibly moved to the poultry's neck for imparting a required breaking force to the poultry's neck.

It is found desirable that the chisel has a concave sharp side. This arranges that the chisel has self-orienting capability with reference to the poultry's neck, so that a certain amount of inaccuracy in the location of the neck is acceptable, without adversely affecting the accuracy of the position where the neck of the poultry is broken.

One of the desirable features of the invention is that prior to imparting a breaking force to the poultry's neck, the poultry is supported at or near its shoulder joints for accurately positioning the poultry. This ensures that the plane at which the imparting breaking force is applied to the poultry can be predictably maintained. Needless to say that this is very beneficial for promoting the accuracy and reliability of the method and the device of the invention. Correspondingly the machine according to the invention preferably comprises supporting means for the poultry at or near its shoulder joints. These supporting means can be suitably embodied as a brace.

To further promote the objects of the invention it may be desirable that the poultry's neck is fixed in a predetermined position prior to imparting a breaking force to the poultry's neck. In connection therewith it is preferable that the machine includes holding means for fixing the poultry's neck in a predetermined position. Suitably the holding means are embodied as a gripper for the poultry's neck.

The invention will hereinafter be further elucidated with reference to a drawing of a non-limiting exemplary embodiment of the poultry neck breaker machine of the invention and its method of operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Whenever in the figures the same reference numerals are applied, these numerals refer to the same parts.

DETAILED DESCRIPTION OF THE INVENTION

Figure 1:
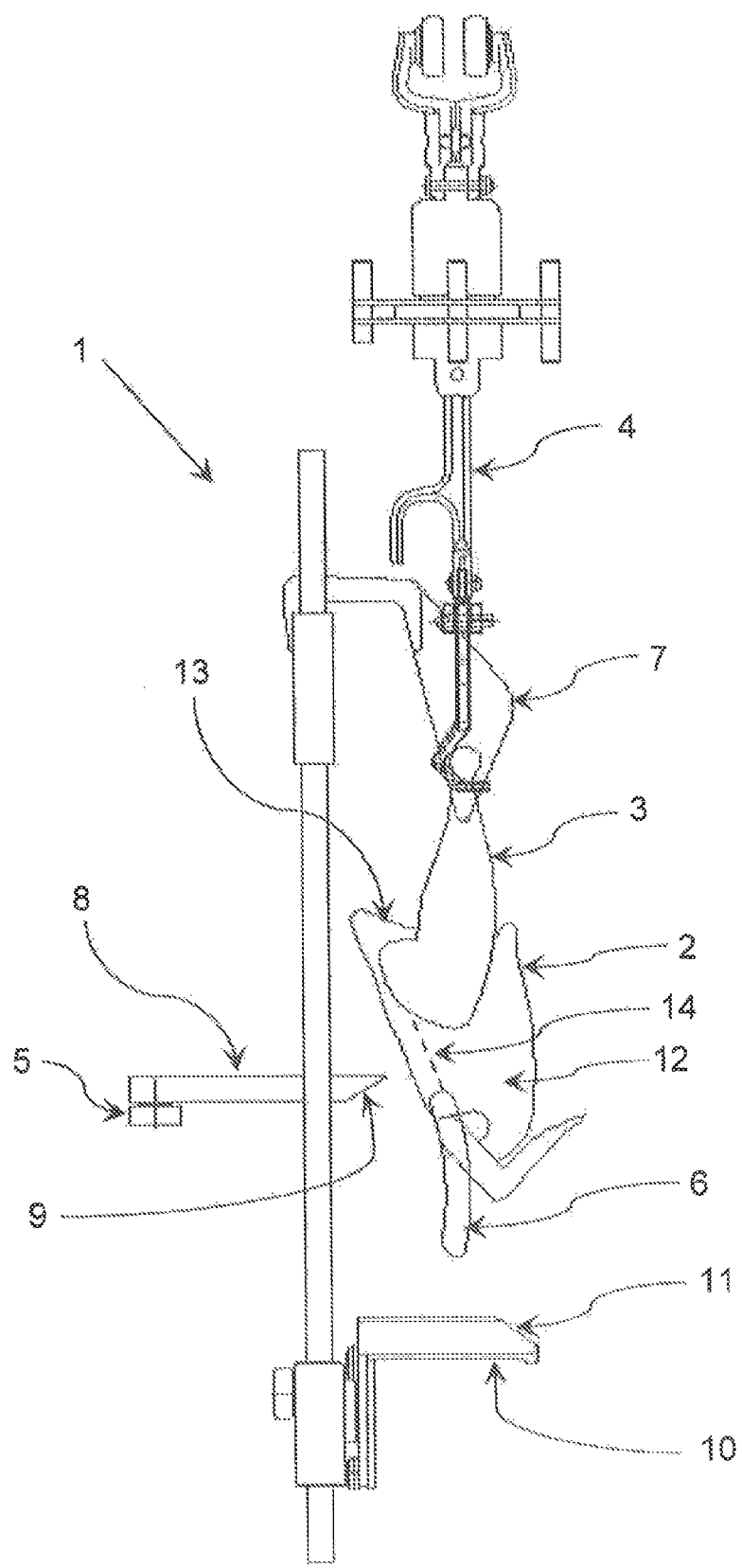
FIGS. 1, 2, 3, 4, and 5 shows a series of operations carried out with the poultry neck breaker machine of the invention on a poultry carcass suspended by its legs.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

In FIGS. 1 through 5, an exemplary embodiment of a poultry neck breaker machine of the invention is depicted with reference 1. The exemplary poultry neck breaker machine 1 operates on poultry 2 suspended by the legs 3 in a conveyor line 4. Machine 1 includes a movable breaker device 5 for imparting a breaking force to the poultry's neck 6. The poultry neck breaker machine 1 further includes an anvil 7 to provide support to the poultry's neck 6 during operation of the movable breaker device 5. For this exemplary embodiment, the movable breaker device 5 is preferably provided with a back-and-forth movable chisel 8, the function and operation of which will become clear from the following description. It is found preferable that the chisel 8 is provided with a concave sharp side 9.

In FIG. 1, the anvil 7 is still above and outside the poultry 2. In FIGS. 2 through 5, the anvil 7 is introduced into the poultry cavity 12 through the poultry's vent 13 in a way that during operation of the movable breaker device 5 the anvil 7 preferably lies adjacent to the poultry's spinal cord 14 so as to provide support to the spinal cord 14. The location and relative positions of the poultry cavity 12, the poultry vent 13, and the poultry's spinal cord 14 are of course known to the skilled person, yet are shown to remove any doubt as to the relative positioning and movement of the anvil 7.

For this exemplary embodiment, the poultry neck breaker machine 1 includes supporting means (not shown) to provide support to the poultry 2 at or near its shoulder joints to promote accurate positioning of the poultry 2. The supporting means are suitably embodied as a brace. More importantly, the machine 1 also includes holding means 10 for fixing the poultry's neck 6 in a predetermined position, which are preferably embodied as a gripper 11 for the poultry's neck 6.

By the introduction of the anvil 7 in the poultry cavity of the suspended poultry 2 and by the application of the holding means 10 for fixing the poultry's neck 6 in a predetermined position prior to imparting a breaking force to the poultry's neck, the reliability and effectiveness of the movable breaker device 5 for breaking the neck 6 of the poultry 2 is secured. This also promotes the avoidance of bone splinters which may otherwise occur due to the breaking of the neck 6.

Figure 2:
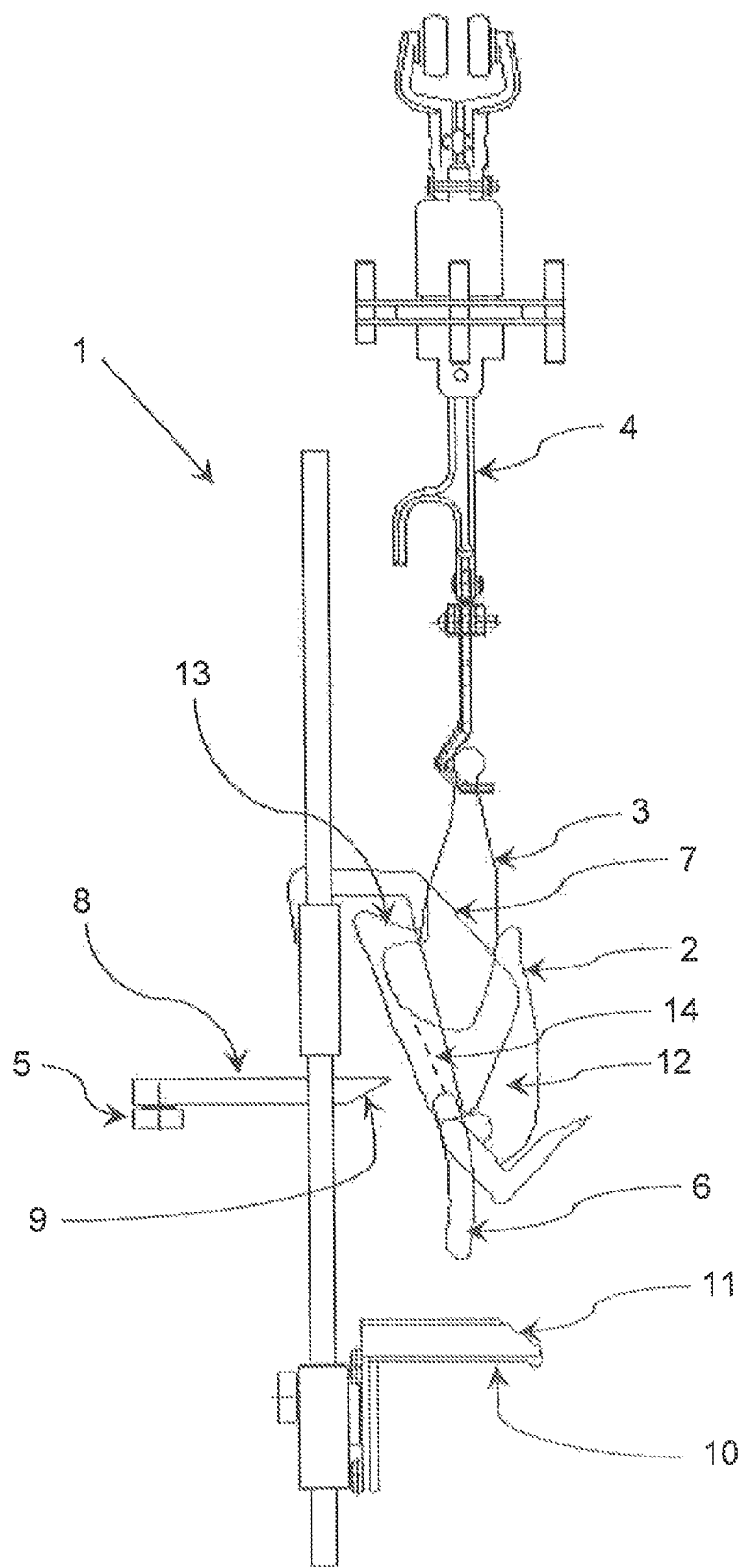
Figure 3:
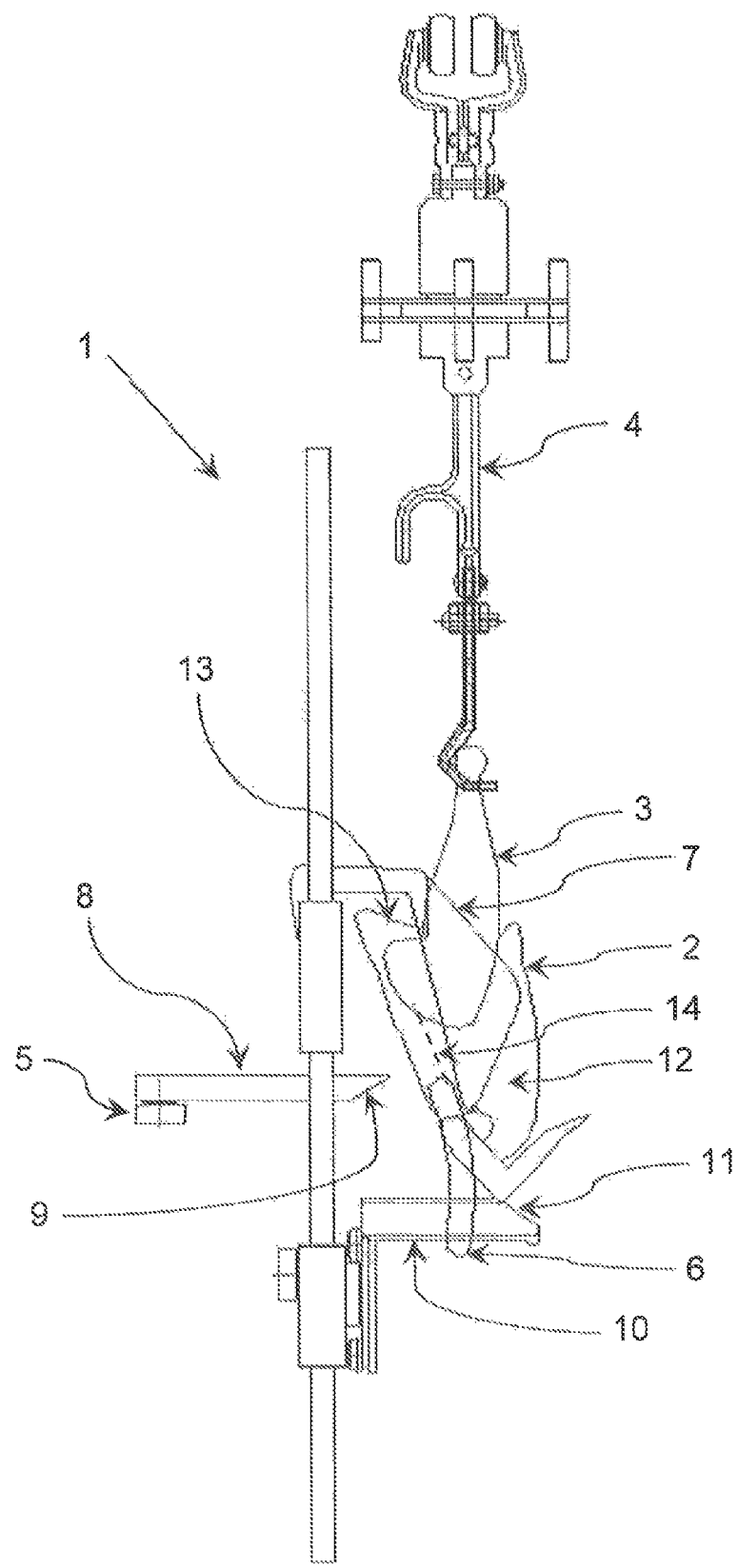
Figure 4:
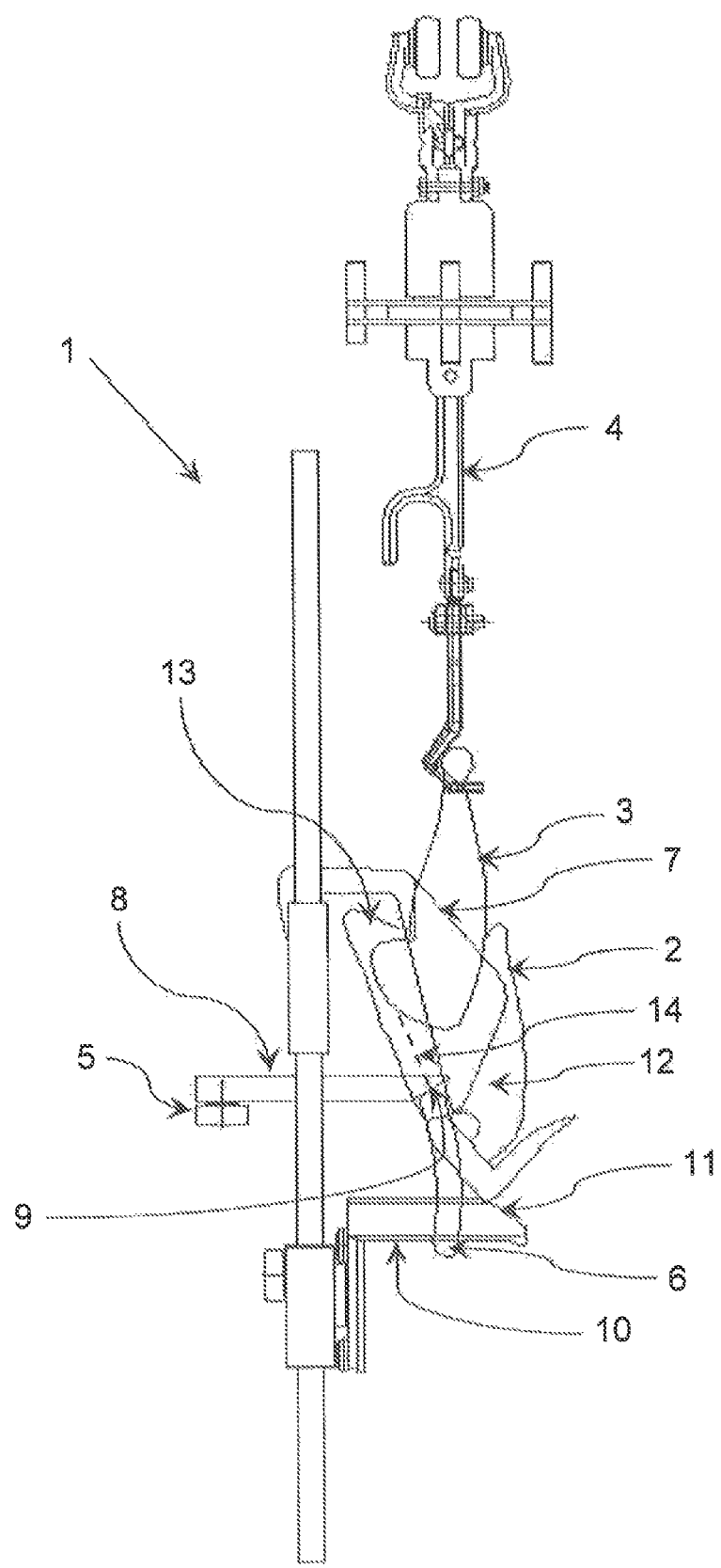
Figure 5:
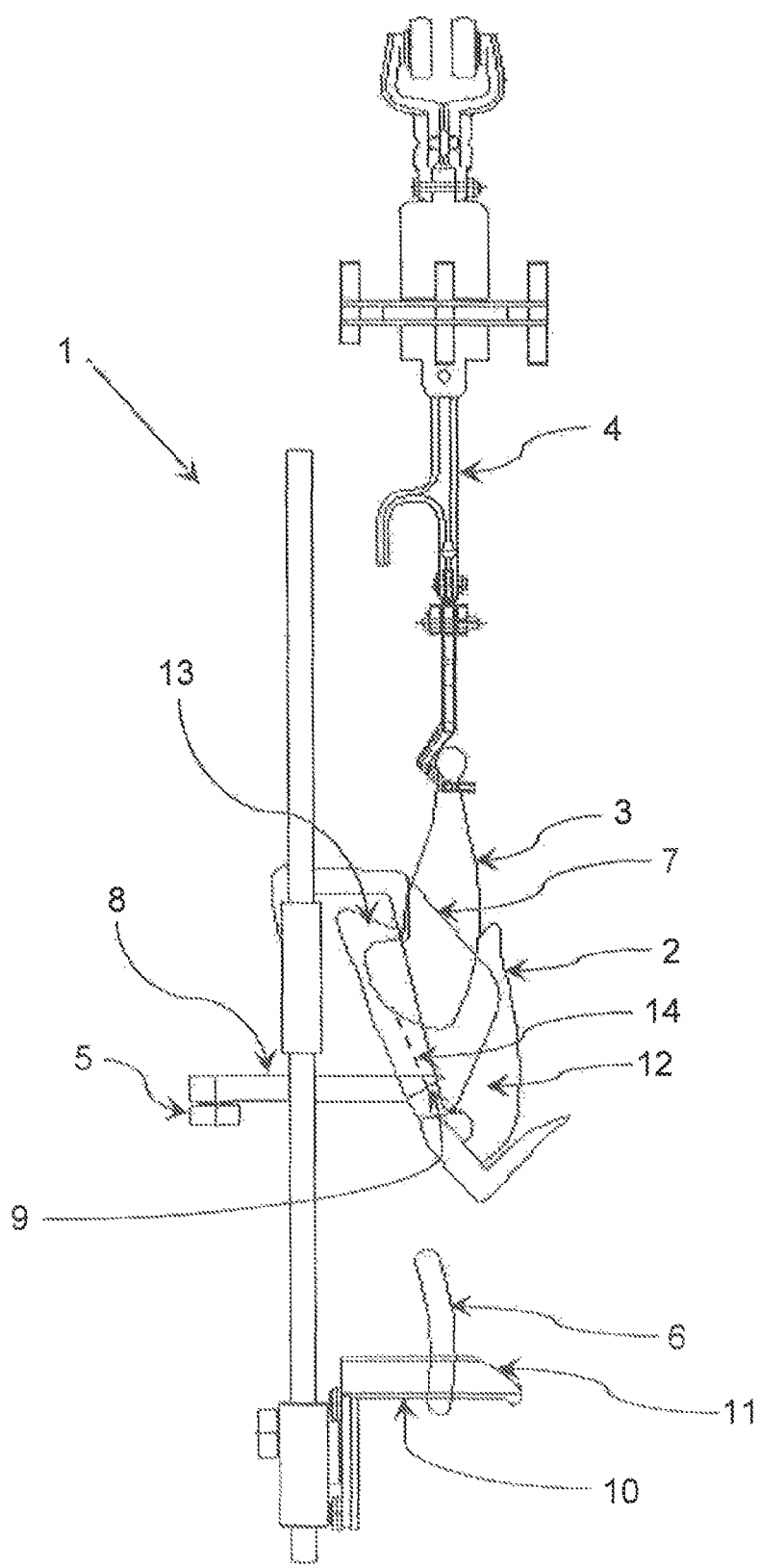

The operation of the neck breaker machine 1 of the invention includes the step that after the introduction of the anvil 7 in the poultry cavity of the suspended poultry 2 (as shown in FIG. 2) the back-and-forth movable chisel 8 is forcibly moved to the poultry's neck 6 for imparting a breaking force to the poultry's neck 6. FIGS. 1 through 5 show the preferential embodiment in which the chisel 8 is movable horizontally back-and-forth. The movement of the chisel 8 is shown in the series of sequences imaged by FIGS. 3, 4, and 5. In FIG. 3, the chisel 8 is in front of the neck 6 of the poultry 2, whereas in FIG. 4 it is shown that the back-and-forth movable chisel 8 has entered the poultry neck 6 and has broken the spinal cord of the poultry 3. In FIG. 5 it is shown that after the chisel 8 has broken the neck 6 of the poultry 2, the holding means 10 can take away the broken and released poultry neck 6 from the suspended poultry 2.

Although the invention has been discussed in the foregoing with reference to an exemplary embodiment of the poultry neck breaker machine of the invention, the invention is not restricted to this particular embodiment which can be varied in many ways without departing from the gist of the invention. The discussed exemplary embodiment shall therefore not be used to construe the appended claims strictly in accordance therewith. On the contrary, the exemplary embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A poultry neck breaker machine for operating on poultry, the poultry having a neck, vent, shoulder joints, and legs, the poultry suspended by the legs in a conveyor line, the poultry neck breaker machine comprising:
   a movable breaker device for imparting a breaking force to the poultry's neck; and
   an anvil to provide support to the poultry's neck during operation of the movable breaker device, wherein the anvil is arranged for introduction into a poultry cavity through the poultry's vent.

2. The poultry neck breaker machine as in claim 1, wherein during operation of the movable breaker device, the anvil lies adjacent to the poultry's spinal cord.

3. The poultry neck breaker machine as in claim 1, wherein the movable breaker device 17 comprises a back-and-forth movable chisel.

4. The poultry neck breaker machine as in claim 3, wherein the chisel is movable back-and-forth along a horizontal direction.

5. The poultry neck breaker machine as in claim 4, wherein the chisel comprises a concave sharp side.

6. The poultry neck breaker machine as in claim 1, further comprising supporting means for the poultry at or near the shoulder joints for accurately positioning of the poultry.

7. The poultry neck breaker machine as in claim 6, wherein the supporting means comprises a brace.

8. The poultry neck breaker machine as in claim 1, further comprising holding means for fixing the poultry's neck in a predetermined position.

9. The poultry neck breaker machine as in claim 8, wherein the holding means comprises a gripper for the poultry's neck.

10. A method for breaking a poultry's neck while the poultry is suspended by legs in a conveyor line, the method comprising the steps of:
    introducing an anvil into a vent of the poultry;
    supporting the poultry's neck by the anvil; and
    imparting a breaking force to the poultry's neck while the poultry's neck is supported by the anvil.

11. The method for breaking a poultry's neck as in claim 10, wherein the supporting step further comprises positioning an anvil adjacent to the poultry's spinal cord.

12. The method for breaking a poultry's neck as in claim 10, wherein the imparting step further comprises moving a back-and-forth movable chisel to the poultry's neck.

13. The method for breaking a poultry's neck as in claim 12, wherein the chisel comprises a concave sharp side.

14. The method for breaking a poultry's neck as in claim 12, the poultry having shoulder joints, the method further comprising the step of:
   supporting the poultry at or near the shoulder joints prior to the step of imparting a breaking force.

15. The method for breaking a poultry's neck as in claim 14, wherein the step of supporting further comprises:
   providing a brace into position to support the poultry at or near the shoulder joints.

16. The method for breaking a poultry's neck as in claim 14, further comprising the step of
   fixing the poultry's neck in a predetermined position prior to the step of imparting a breaking force to the poultry's neck.

* * * * *